United States Patent [19]

Hopf et al.

[11] 4,261,186
[45] Apr. 14, 1981

[54] JOINT STRUCTURE WITH LUBRICATING BORES

[75] Inventors: Wilhelm Hopf, Stuttgart; Rudolf Wonneberger, Winnenden, both of Fed. Rep. of Germany

[73] Assignee: Daimler-Benz Aktiengesellschaft, Stuttgart, Fed. Rep. of Germany

[21] Appl. No.: 9,080

[22] Filed: Feb. 2, 1979

[30] Foreign Application Priority Data

Feb. 7, 1978 [DE] Fed. Rep. of Germany ....... 2805100

[51] Int. Cl.³ .............................................. F16D 3/26
[52] U.S. Cl. .................................. 64/17 A; 64/17 SP
[58] Field of Search ............... 64/17 A, 17 SP, 30 LB

[56] References Cited

U.S. PATENT DOCUMENTS

| 1,911,214 | 5/1933 | Van Ranst | 64/17 SP |
| 1,987,807 | 1/1935 | Swenson | 64/17 SP |
| 2,133,176 | 10/1938 | Parent | 64/17 SP |
| 2,380,646 | 7/1945 | Harrington | 64/17 A |
| 3,001,386 | 9/1961 | King | 64/17 R |
| 3,785,460 | 1/1974 | Smith et al. | 64/17 A |

FOREIGN PATENT DOCUMENTS 674500 4/1939 Fed. Rep. of Germany .
G 1870 11/1952 Fed. Rep. of Germany .

*Primary Examiner*—Ira S. Lazarus
*Attorney, Agent, or Firm*—Craig and Antonelli

[57] ABSTRACT

A joint arrangement with lubricating bores which are connected with all bearing places; the lubricating bores are arranged in a circulation that can be supplied exclusively from one lubricating nipple and is adapted to be vented by way of a vent opening arranged in proximity of the lubricating nipple.

15 Claims, 10 Drawing Figures

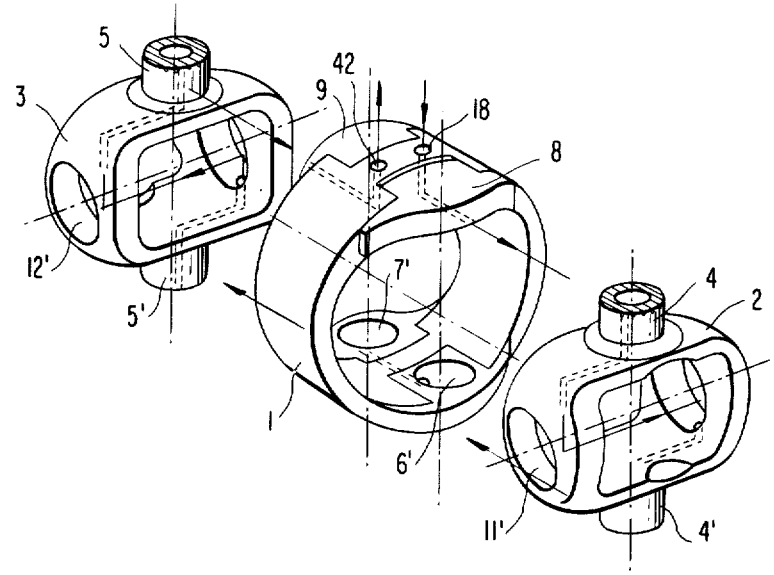
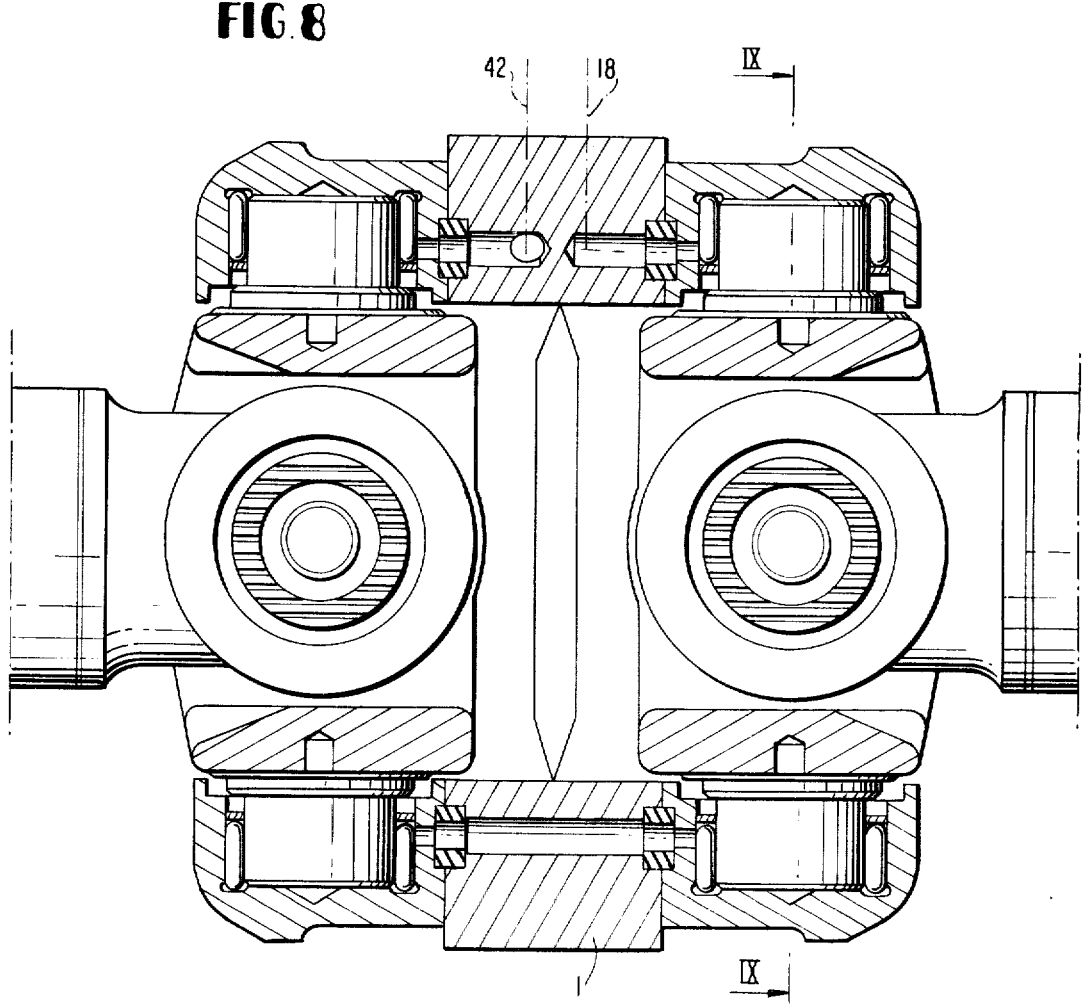

JOINT STRUCTURE WITH LUBRICATING BORES

The present invention relates to a joint arrangement with lubricating bores, which are connected with all bearing places and are equipped with lubricating nipples, whereby at least two joint frames pivotally supported in a common joint ring are provided, which are each constructed for the bearing support of a bolt serving for the connection to a shaft fork.

Known joint arrangements of this type provide in each case lubricating nipples diametrally oppositely arranged on the joint ring, from which lubricating bores lead to the needle bearings of the bearing bolts of the two joint frames and from there to the needle bearings of the bolts through bores extending within the joint frame. The joint arrangement with eight bearing places must therefore be lubricated from both sides, and more particularly for such length of time until the lubricating grease escapes at correspondingly constructed lip seals. These arrangements therefore presuppose that the lubricating operation takes place from two sides. However, it may happen depending on the position of the needle bearings or the like that the grease through-flow is throttled at a place. The grease which selects the path of least resistance, then no longer flows to the bearing supports to be lubricated but to the other bearing pin or trunion located on the other side of the lubricating nipple. It is therefore possible that some bearing places are devoid of grease or are supplied inadequately with grease. As a result thereof, a part of the joint is not lubricated at all or is lubricated only inadequately and the bearing places also cannot be cleaned of dirt particles that have penetrated, by the grease flow.

The present invention is concerned with the task to avoid the aforementioned shortcomings and drawbacks and to so construct a joint arrangement having lubricating bores that an assurance exists for the adequate lubrication at all bearing places to be supplied. The present invention essentially consists in that the lubricating bores are arranged in a circulatory system which is adapted to be supplied exclusively from a single lubricating nipple and is adapted to be vented by way of an opening arranged in proximity of the lubricating nipple. As a result of this construction, the lubricating grease is forced to flow through all bearing places to be lubricated up to the vent opening so that also with the universal joint shafts which are constructed in a relatively complicated manner, a completely satisfactory lubrication of the joint is possible. A faulty conduction or incorrect flow of a partial grease stream is precluded.

The vent opening can be provided appropriately with a valve in order that a certain lubricating pressure can be maintained. All the other lubricating places are thereby appropriately sealed off with respect to the outside by sealing rings of large volume since no grease escape is desired at these places.

Accordingly, it is an object of the present invention to provide a joint arrangement which avoids by simple means the aforementioned shortcomings and drawbacks encountered in the prior art.

Another object of the present invention resides in a universal joint arrangement with lubricating bores which is simple in construction, yet assures completely satisfactory lubrication of all bearing places.

A further object of the present invention resides in a joint arrangement with lubricating bores, which can be lubricated in a more simple manner by requiring lubrication from only a single place.

Still a further object of the present invention resides in a universal joint arrangement with lubricating bores, in which all bearing places are assured with an adequate supply of lubricating grease.

Another object of the present invention resides in a lubricating system for a universal joint shaft which not only permits the maintenance of a certain lubricating pressure but enables the use of large sealing rings to prevent the escape of grease at the bearing places.

These and other objects, features and advantages of the present invention will become more apparent from the following description when taken in connection with the accompanying drawing which shows, for purposes of illustration only, two embodiments in accordance with the present invention, and wherein:

FIG. 7 is a perspective, exploded view of a modified embodiment of a joint for a universal joint shaft which is constructed according to the present invention and in which the vent opening is arranged with the lubricating nipple in the symmetry plane of the joint;

FIG. 8 is a longitudinal cross-sectional view through the joint of FIG. 7 in the assembled condition and on an enlarged scale;

Figures 1, 2:
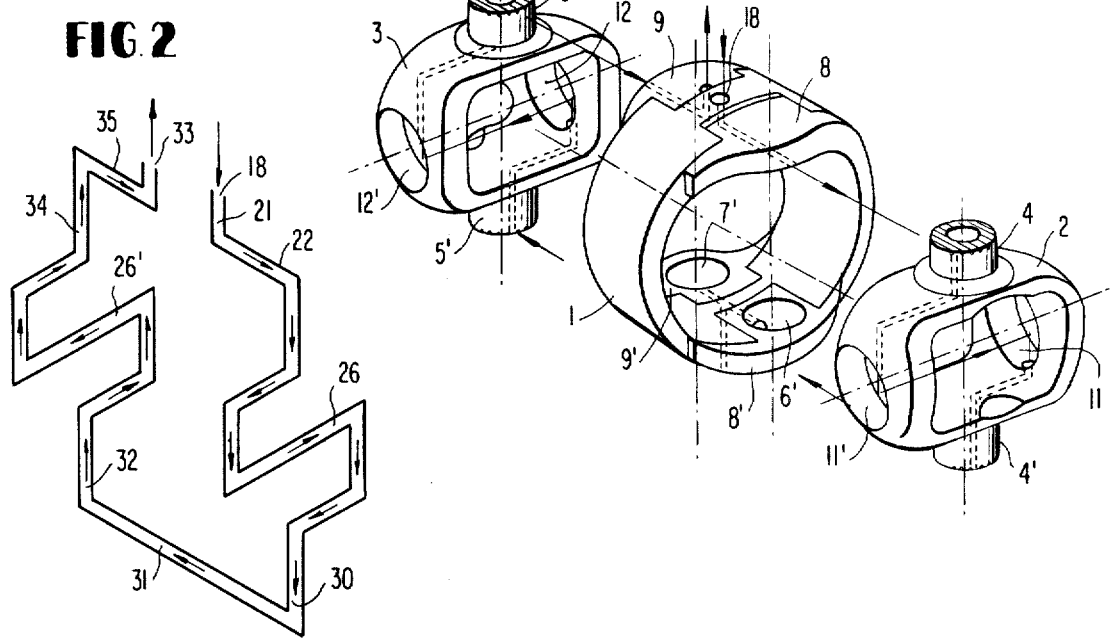
FIG. 1 is a perspective, exploded view illustrating the three basic parts of a double joint for a universal joint shaft according to the present invention, in which lubricating bores for the supply of all eight bearing places are provided.
FIG. 2 is a schematic view of the arrangement of the lubricating bores of the embodiment of FIG. 1 which takes place in a circulatory system.

Referring now to the drawing wherein like reference numerals are used throughout the various views to designate like parts, a joint ring 1 is shown in FIG. 1 which serves for the mounting and accommodation of two joint frames 2 and 3 to be arranged symmetrically to the center plane of the joint ring 1, which are each retained by means of bearing pins or trunions 4, 4', respectively, 5, 5' in corresponding bearing sockets 6, 6', respectively, 7, 7' of the joint ring 1 (FIGS. 1 and 4), whereby in FIG. 1 only the lower bearing sockets 6' and 7' for the mounting of the bearing pins 4' and 5' can be seen. For assembly reasons, the bearing sockets 6, 6', 7, 7' are arranged in each case in detachable inserts 8, 8', 9, 9' which are secured at the joint ring 1 by screws (not shown) inserted into the bores 10 that can be seen in FIG. 4. Bearing bores 11 and 11', respectively, 12 and 12' are machined into the two joint frames 2 and 3 whose respective common axis extends perpendicularly to one of the bearing pins 4 and 4', respectively, 5 and 5'. As can be seen from FIGS. 3 and 4, bolts 13 for the bearing support of the end parts 14 of shafts, not shown in detail, are inserted into these bearings bores 11, 11' and 12, 12'. The bolts 13 are supported in the bores 11, 11' and 12, 12', respectively, by means of needle bearings 15. The needle bearings 15 are each sealed against the outside in that a cap-like head portion 16 of a screw or bolt closes off the bore 11 against the outside and a cap-like nut 16a closes off the bore 11' against the outside (FIG. 4).

The pins or trunions 4, 4', 5, 5' are also supported in the bearing sockets 6, 6', respectively, 7, 7' by way of needle bearings 17 (FIG. 3) and the sealing takes place in this case by means of seals 38 and 39 in a manner illustrated in detail in FIG. 5 which will be described more fully hereinafter. The joint arrangement of FIGS. 1, 3, and 4 thus includes eight bearing places with needle bearings, which must be lubricated. For this purpose, the bearing ring 1 is provided at its top side with a lubricating nipple 18 (FIG. 3) which terminates in an axially extending bore 19 which, in turn, terminates by way of a sealing ring 20 in a corresponding connecting bore of the bearing socket 6. A continuing bore 21 (FIG. 4) which extends coaxially to the bearing pin 4 is provided thereat, which passes over into the bore sections 22 and 23 which then terminate in the bearing place for the bolt 13 provided inside of the bore 11'. The bore section 22 extends for manufacturing reasons toward the outside and is closed off thereat by a closure plug 24. The bolt 13 itself is constructed hollow and so much space remains between the cap 16a and the end face of the bolt 13 that an annular space 25 results, by way of which a connection exists leading into the tubularly shaped space 26 inside of the bolt 13 and from there to the annular space 27 within the area of the bore 11. Bores 28 and 29 again lead from this bore 11 to a bore extending coaxially in the bearing pin 4' which, as can be seen from FIG. 3, is connected again by way of sealing rings 20 with a connecting bore 31 which leads to the bearing socket 7'. From there, a bore 32 extending axially in the bearing pin 5' now leads into the joint frame 3 analogously to the showing of the joint frame 2 in FIG. 4 and the circulation of the lubricating bores starting from the lubricating nipple 18 is indicated schematically in detail in FIG. 2. All lubricating lines are sealed off against the outside so that only the path along the individual lubricating sections remains up to the vent opening 33 (FIG. 3) which is arranged adjacent the lubricating nipple 18 at the top side of the joint ring 1.

For that purpose, the lubricating grease must traverse the paths described above and then in the joint frame 3 the path through the corresponding bolt disposed thereat together with the annular space 26', then reaches the bore 34 extending axially in the bearing pin 5 and from there the vent opening 33 which is constructed as a slot between the joint ring 1 and the insert member 9. A short bore section 35 which leads from the bearing socket 7 to the slot 33, thereby terminates in a space 36, in which an elastically compressible ball 37 or the like is arranged. This ball 37 acts as valve and opens up the path for the grease escape only upon reaching a predetermined pressure. Any air that may be present also leaves through the gap 33.

Figure 5:
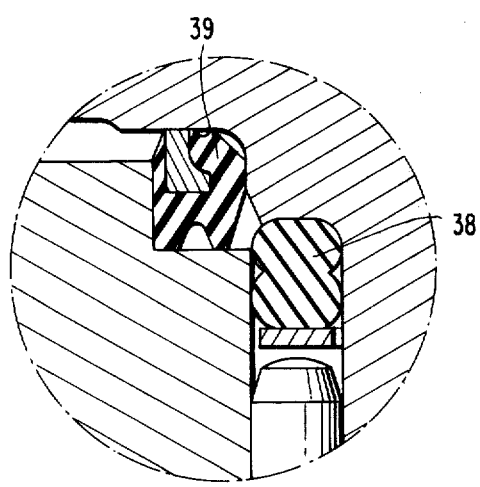
FIG. 5 is a partial cross-sectional view, illustrating the details of the sealing place indicated by the corresponding dash and dotted circle in FIG. 4.
Figure 6:
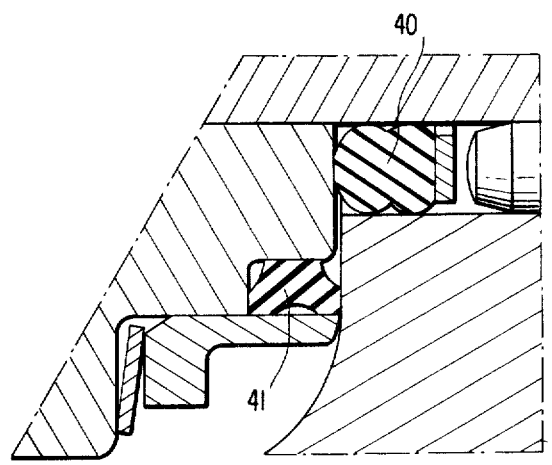
FIG. 6 is a partial cross-sectional view, illustrating the details of another sealing place of the joint of FIG. 4, indicated by the corresponding dash and dot circle of FIG. 4.

In order that no grease and also no air can escape at the bearing places, the seals having sealing rings 38, 39, respectively, 40, 41 with large volume are provided which are illustrated in detail in FIGS. 5 and 6. These sealing rings are shown larger only for purposes of illustration. The advantage of the present invention resides in that such large-volume sealing rings can be used which had to be constructed in the prior art constructions as sealing lips because the grease escape had to take place thereat.

Figure 3:
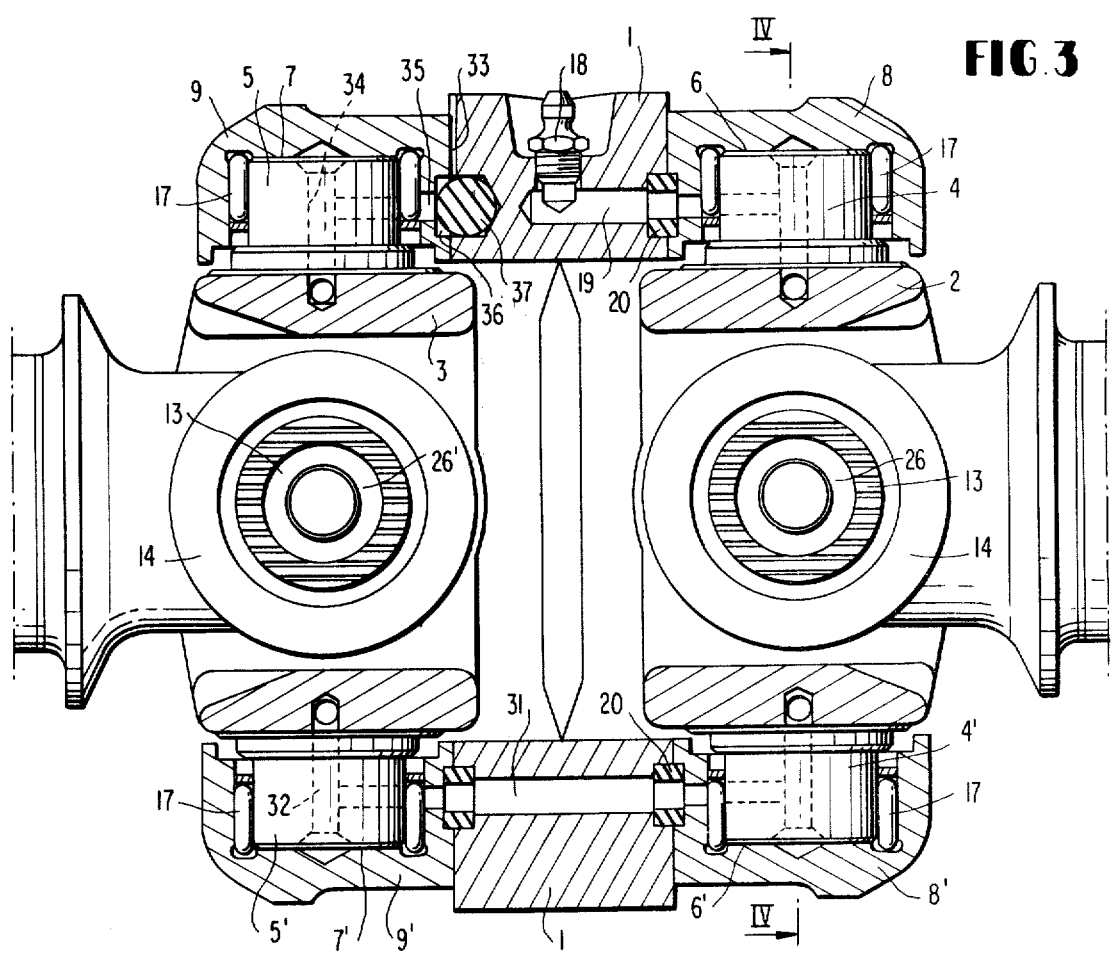
FIG. 3 is a longitudinal cross-sectional view through the joint of FIG. 1, however, in the assembled condition and on an enlarged scale.
Figure 4:
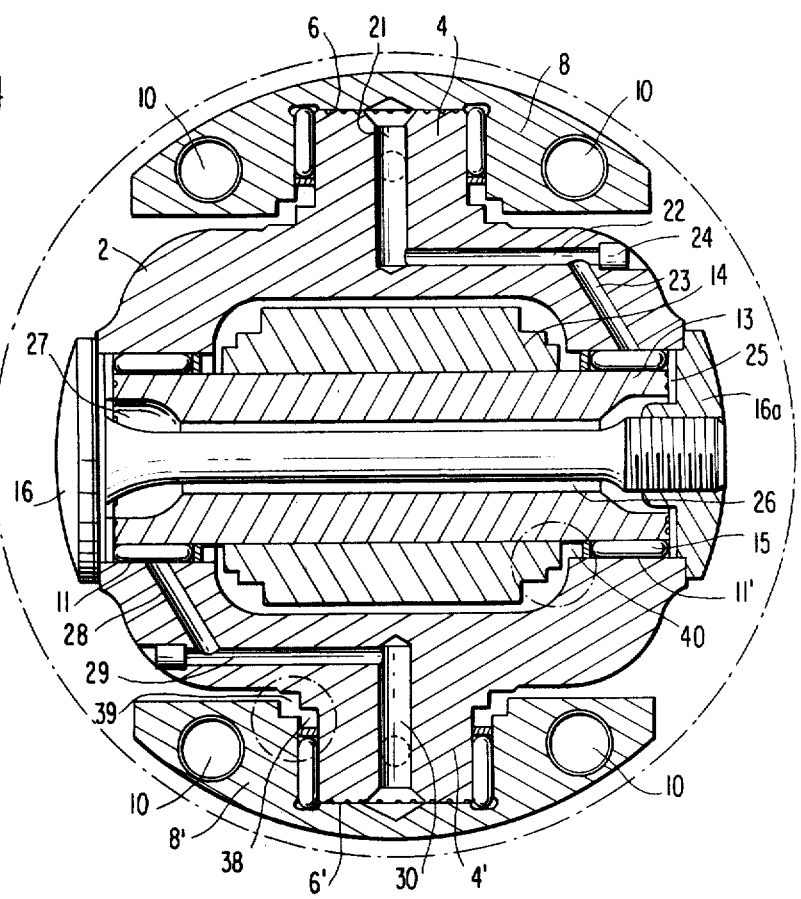
FIG. 4 is a cross-sectional view, taken along line IV—IV of FIG. 3.
Figure 9:
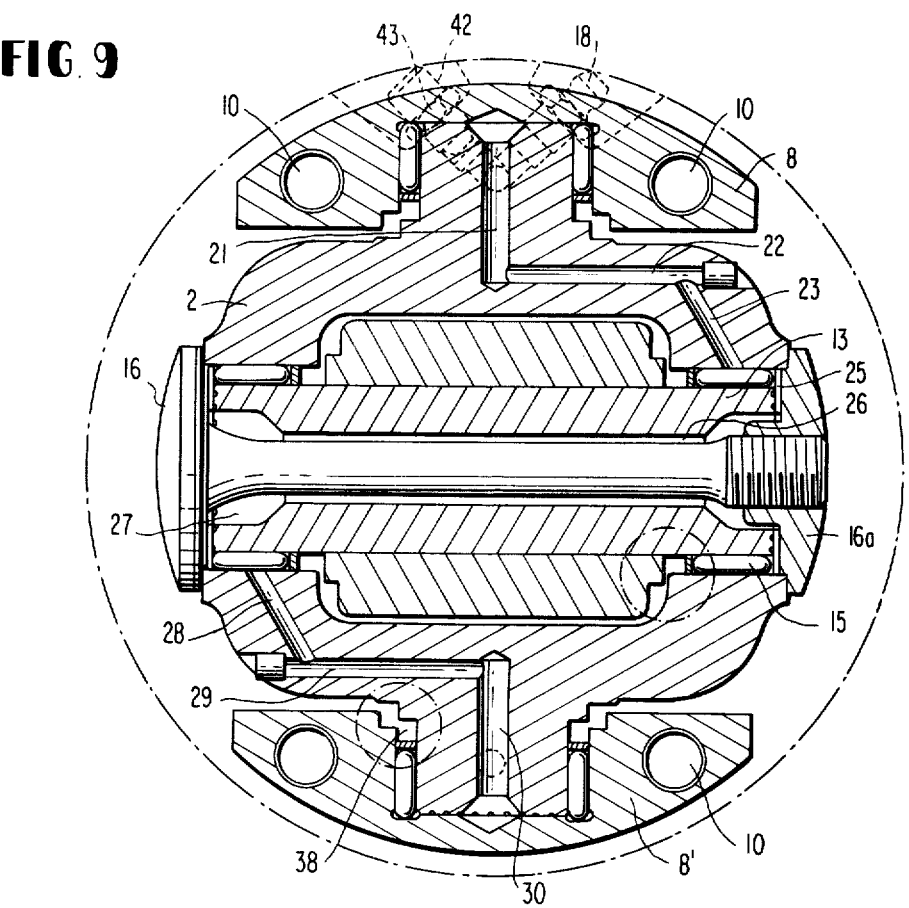
FIG. 9 is a transverse cross-sectional view through the embodiment of FIG. 8, taken along line IX—IX of FIG. 8.
Figure 10:
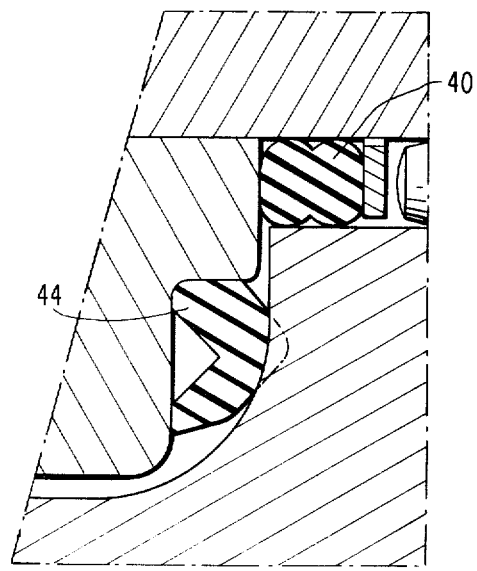
FIG. 10 is a partial cross-sectional view, on an enlarged scale, illustrating the sealing place of the embodiment of FIG. 9 indicated by the corresponding dash and dot circle.

An analogous construction is shown in FIG. 7 which differs from the construction shown in FIGS. 1 and 3 only in that the vent opening is not constructed as a slot between the joint ring 1 and the insert member 9 but as separate vent opening 42 in the joint ring 1. It can be seen in detail from FIGS. 8 and 9 that both the lubricating nipple 18 as also the vent valve 43 are arranged inclined to the center plane of the joint ring 1; the lubricating nipple 18 is thereby axially offset to the valve 43. Both parts are shown in FIG. 9 in dash line only for the sake of illustration. They are normally not visible as such in the cross section according to FIG. 9. The same reference numerals as used with the previous embodiment were used again for the lubricating bores which are laid out in an analogous manner. A further difference of the embodiment of FIG. 7 consists exclusively in the selection of the seal of the bolt 13 which takes place in this case by the sealing ring 40 and additionally, as can be seen from FIG. 10, by the special ring 44. It is important in all cases to seal off the individual bearing places against the outside in order that the grease forced-in through the lubricating nipple 18 can only pass through the circulation schematically indicated in FIG. 2 so that the assurance for a cleaning of all bearing places and for a sufficient lubrication thereof exists. This is achieved by the present invention.

While we have shown and described only two embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. A joint arrangement with lubricating bores which are operatively connected with all bearing places, which comprises at least two joint frame means pivotally supported in a common joint ring means, each of said joint frame means including bearing support means serving the connection with a shaft, characterized in that the lubricating bores are arranged in a single continuous path forming a circulatory system which is operable to be supplied exclusively from one lubricating nipple and is operable to be vented by way of a vent opening means arranged in proximity of the lubricating nipple.

2. A joint arrangement according to claim 1, characterized in that said bearing support means includes a bolt-like member.

3. A joint arrangement according to claim 1 or 2, characterized in that the vent opening means includes a valve means.

4. A joint arrangement according to claim 3, characterized in that all bearing places are sealed off against the outside by sealing ring means.

5. A joint arrangement according to claim 4, characterized in that said sealing ring means are of relatively large volume.

6. A joint arrangement according to claim 5, characterized in that at least one lubricating bore is formed by a hollow space in the bolt-like member of the bearing support means for the shaft.

7. A joint arrangement according to claim 1, characterized in that all bearing places are sealed off against the outside by sealing ring means.

8. A joint arrangement according to claim 1, characterized in that said sealing ring means are of relatively large volume.

9. A joint arrangement according to claim 2, characterized in that at least one lubricating bore is formed by a hollow space in the bolt-like member of the bearing support means for the shaft.

10. A joint arrangement according to claim 1, characterized in that at least one lubricating bore is formed by a hollow space in the bearing support means for the shaft.

11. A joint arrangement according to claim 1, characterized in that lubricants supplied to said circulatory system must flow past said all bearing places before reaching said vent opening.

12. A joint arrangement with lubricating passageways, said passageways being connected with all bearing points of the joint arrangement, wherein at least two joint frames are pivotably mounted in a common joint ring, said two joint frames being adapted to support a pin serving for a connection to a shaft, characterized in that said lubricating passageways form a single continuous lubricating circuit for lubricating all of the bearing points of the joint arrangement, said single continuous lubricating circuit being supplied exclusively by one lubricating nipple and being ventable by a vent opening.

13. A joint arrangement according to claim 12, characterized in that said vent opening is disposed in the vicinity of said lubricating nipple.

14. A joint arrangement according to claim 13, characterized in that at least one lubricating passageway is formed by a chamber in said pin holding said shaft.

15. A joint arrangement having a lubricating bore for supplying lubricant to all bearing places of the joint arrangement, said arrangement comprising at least two joint frame means pivotally supported in a common joint ring means, each of said joint frame means including bearing support means serving a connection with a shaft, characterized in that said lubricating bores are disposed in a circuit forming a single lubricant guide passageway which is operable to be supplied exclusively from one lubricating nipple disposed at one end of said passageway and is operable to be vented by way of a vent opening means disposed at the other end of said passageway, wherein lubricants supplied to said circuit through said lubricating nipple must pass through all of said bearing places before being ejected through said vent opening.

* * * * *